United States Patent
Erno et al.

(10) Patent No.: US 9,103,326 B2
(45) Date of Patent: Aug. 11, 2015

(54) WIND TURBINE BEDPLATE SUPPORT FRAME

(75) Inventors: Daniel Jason Erno, Clifton Park, NY (US); Fulton Jose Lopez, Clifton Park, NY (US); Robert Michael Zirin, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 452 days.

(21) Appl. No.: 13/562,430

(22) Filed: Jul. 31, 2012

(65) Prior Publication Data
US 2014/0037456 A1 Feb. 6, 2014

(51) Int. Cl.
*F03D 11/00* (2006.01)

(52) U.S. Cl.
CPC ......... *F03D 11/0075* (2013.01); *F05B 2240/14* (2013.01); *Y02B 10/30* (2013.01); *Y02E 10/722* (2013.01)

(58) Field of Classification Search
CPC .................................................. F03D 11/0075
USPC ..... 416/106, 107, 500, 244 A, 244 R, DIG. 6
See application file for complete search history.

(56) References Cited

U.S. PATENT DOCUMENTS

| | | | |
|---|---|---|---|
| 5,354,175 A | 10/1994 | Coleman et al. | |
| 7,779,851 B2 * | 8/2010 | Mallookis et al. | 135/114 |
| 7,857,599 B2 | 12/2010 | Bagepalli | |
| 7,944,076 B2 | 5/2011 | Stiesdal | |
| 7,944,079 B1 | 5/2011 | Signore et al. | |
| 7,956,484 B2 | 6/2011 | Stiesdal | |
| 2007/0277470 A1* | 12/2007 | Vichniakov | 52/588.1 |
| 2009/0261594 A1* | 10/2009 | Christensen | 290/55 |
| 2010/0032961 A1 | 2/2010 | Numajiri | |
| 2011/0135475 A1 | 6/2011 | Ahmann et al. | |
| 2011/0135481 A1 | 6/2011 | Koronkiewicz | |
| 2011/0138626 A1 | 6/2011 | Tirumalai et al. | |
| 2012/0025526 A1* | 2/2012 | Luo et al. | 290/44 |
| 2012/0025538 A1* | 2/2012 | Luneau et al. | 290/55 |
| 2012/0131786 A1* | 5/2012 | Neumann | 29/464 |
| 2012/0230836 A1* | 9/2012 | A Porta et al. | 416/244 R |
| 2013/0088016 A1* | 4/2013 | Dinter et al. | 290/55 |
| 2014/0010664 A1* | 1/2014 | Markussen | 416/244 R |

FOREIGN PATENT DOCUMENTS

EP 1617075 A1 1/2006

* cited by examiner

*Primary Examiner* — Liam McDowell
(74) *Attorney, Agent, or Firm* — Ann M. Agosti

(57) ABSTRACT

A bedplate assembly of a wind turbine is provided. The bedplate assembly includes a rotor shaft with a first end coupled to a rotatable hub of the wind turbine via a rotor flange and a second end coupled to a gearbox. The bedplate assembly also includes a bedplate support frame coupled to the gearbox and to the rotor shaft for supporting the gearbox. The bedplate support frame includes a torque arm support device for supporting torque arms of the gearbox. The bedplate support frame also includes a circular support for housing a shaft support bearing for supporting the rotor shaft at the first end. Further, the bedplate support frame includes a cross-structure located under the rotor shaft, wherein the cross-structure comprises one or more arms connected internally to a first side wall and a second side wall.

21 Claims, 6 Drawing Sheets

WIND TURBINE BEDPLATE SUPPORT FRAME

BACKGROUND

The invention relates generally to a wind turbine and more particularly, to a wind turbine bedplate support frame.

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The nacelle includes a rotor assembly coupled to the gearbox and to the generator. The rotor assembly and the gearbox and mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Over time, the gearbox and the rotor assembly become less effective in transferring rotational energy to the generator due to wear and tear. Especially, bearings that support the rotor shaft may become worn or completely fail resulting in damaged bearing bores. This may require gearbox to be removed for periodic maintenance. During removing and/or replacing of the gearbox at top of the tower, a yoking structure is placed over the bedplate support frame and over the rotor assembly that is not removed during maintenance. The yoking structure includes a heavy mass for providing stability and support to the rotor assembly during maintenance. As the rotor blades, and the wind turbines in general, increase in size and weight, the task of mounting the yoking structure become increasingly difficult due to the heavy weight. Thus, maintenance of the wind turbine can be costly and time-consuming.

There is therefore a need for an efficient bedplate support frame in a wind turbine for easy handling and stability of the wind turbine during maintenance or operating conditions.

BRIEF DESCRIPTION

In accordance with an embodiment of the invention, a bedplate assembly of a wind turbine is provided. The bedplate assembly includes a rotor shaft with a first end coupled to a rotatable hub of the wind turbine via a rotor flange and a second end coupled to a gearbox. The bedplate assembly also includes a bedplate support frame coupled to the gearbox and to the rotor shaft for supporting the gearbox. The bedplate support frame includes a torque arm support device for supporting torque arms of the gearbox. The bedplate support frame also includes a circular support for housing a shaft support bearing for supporting the rotor shaft at the first end. Further, the bedplate support frame includes a cross-structure located under the rotor shaft, wherein the cross-structure comprises one or more arms connected internally to a first side wall and a second side wall.

In accordance with an embodiment of the invention, a wind turbine is provided. The wind turbine includes a tower, a nacelle coupled to said tower, a gearbox positioned within said nacelle, a rotor, a rotor shaft rotatably coupling said rotor to said gearbox, and a bedplate assembly located within the nacelle of the wind turbine comprising a bedplate support frame coupled to the gearbox and to the rotor shaft for supporting the gearbox. The bedplate support frame comprises a torque arm support device for supporting torque arms of the gearbox, and a cross-structure located under the rotor shaft, wherein the cross-structure comprises a first pair of symmetrical arms connected to a front portion of the bedplate support frame and a second pair of symmetrical arms connected internally to a first side wall and a second side wall.

In accordance with an embodiment of the invention, a bedplate support frame for use in a wind turbine is provided. The bedplate support frame includes a circular support located at a front portion for housing a shaft support bearing for supporting a rotor shaft at a first end. The bedplate support frame also includes a first sidewall and an opposing second sidewall, said each first sidewall and the second sidewall comprises a pair of beams. The bedplate support frame further includes a pedestal support for supporting the first sidewall, the second sidewall and the circular support at the front portion via a pair of beams and a cross-structure with a first pair of symmetrical arms connected to the front portion of the bedplate support frame and a second pair of symmetrical arms connected internally to the first side wall and the second side wall.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
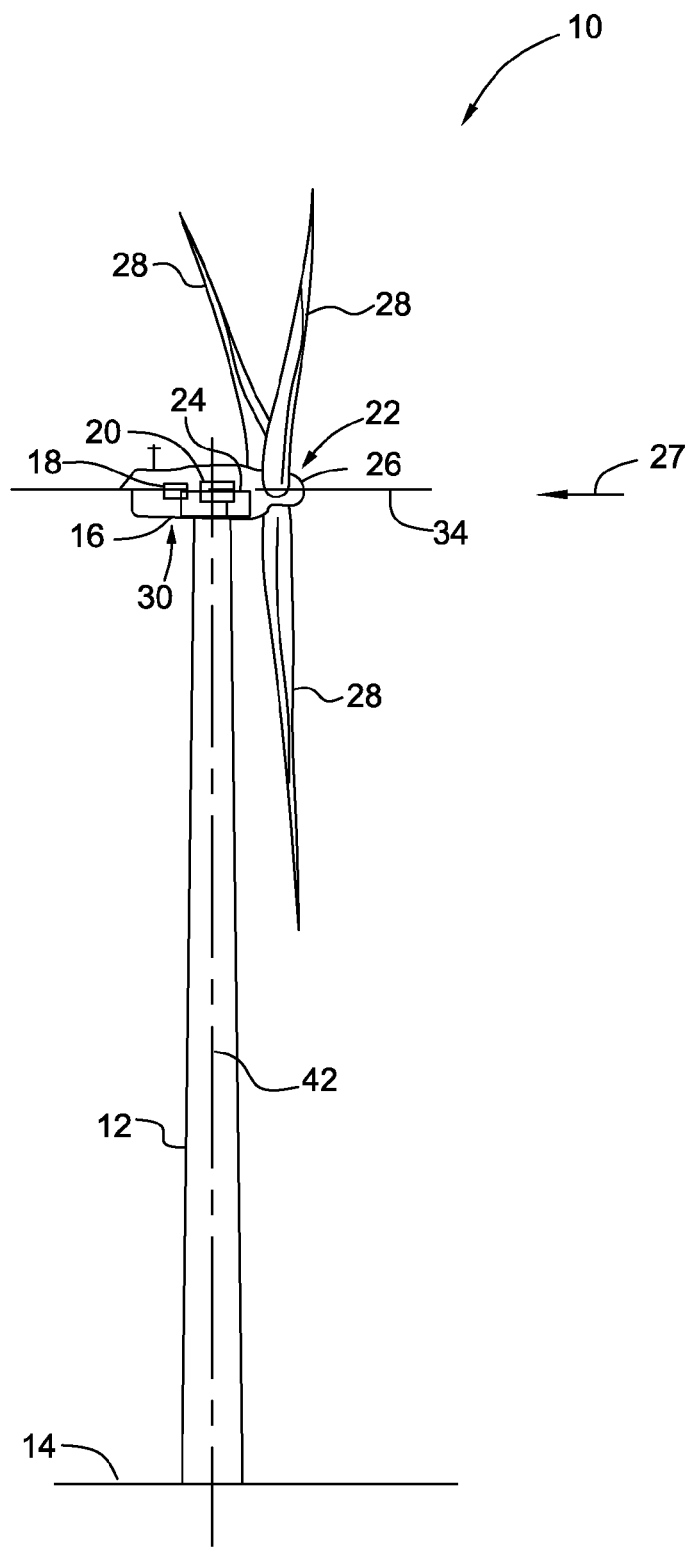
FIG. 1 is a perspective view of a wind turbine in accordance with an embodiment of the present invention.

FIG. 1 is a perspective view of an exemplary wind turbine 10 in accordance with an embodiment of the present invention. In this embodiment, the wind turbine 10 is a horizontal-axis wind turbine. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotatably coupled to the gearbox 20 with a rotor shaft 24. The rotor 22 includes a rotatable hub 26 and at least one rotor blade 28 coupled to and extending outward from the rotatable hub 26. A bedplate assembly 30 includes the rotor shaft 24 coupled to the rotatable hub 26 and further coupled to the gearbox 20 of the wind turbine 10. During maintenance, the bedplate assembly 30 facilitates in removing the gearbox 20 from the nacelle 16 uptower of the wind turbine 10. In the exemplary embodiment, the nacelle 16 includes the rotor shaft 24, the gearbox 20, the generator 18, and a yaw drive mechanism 68 (shown in FIG. 2). In one embodiment, the yaw drive mechanism 68 facilitates the nacelle 16 and the rotatable hub 26 on yaw axis 42 to control the perspective of rotor blades 28 with respect to direction 27 of the wind.

Figure 2:
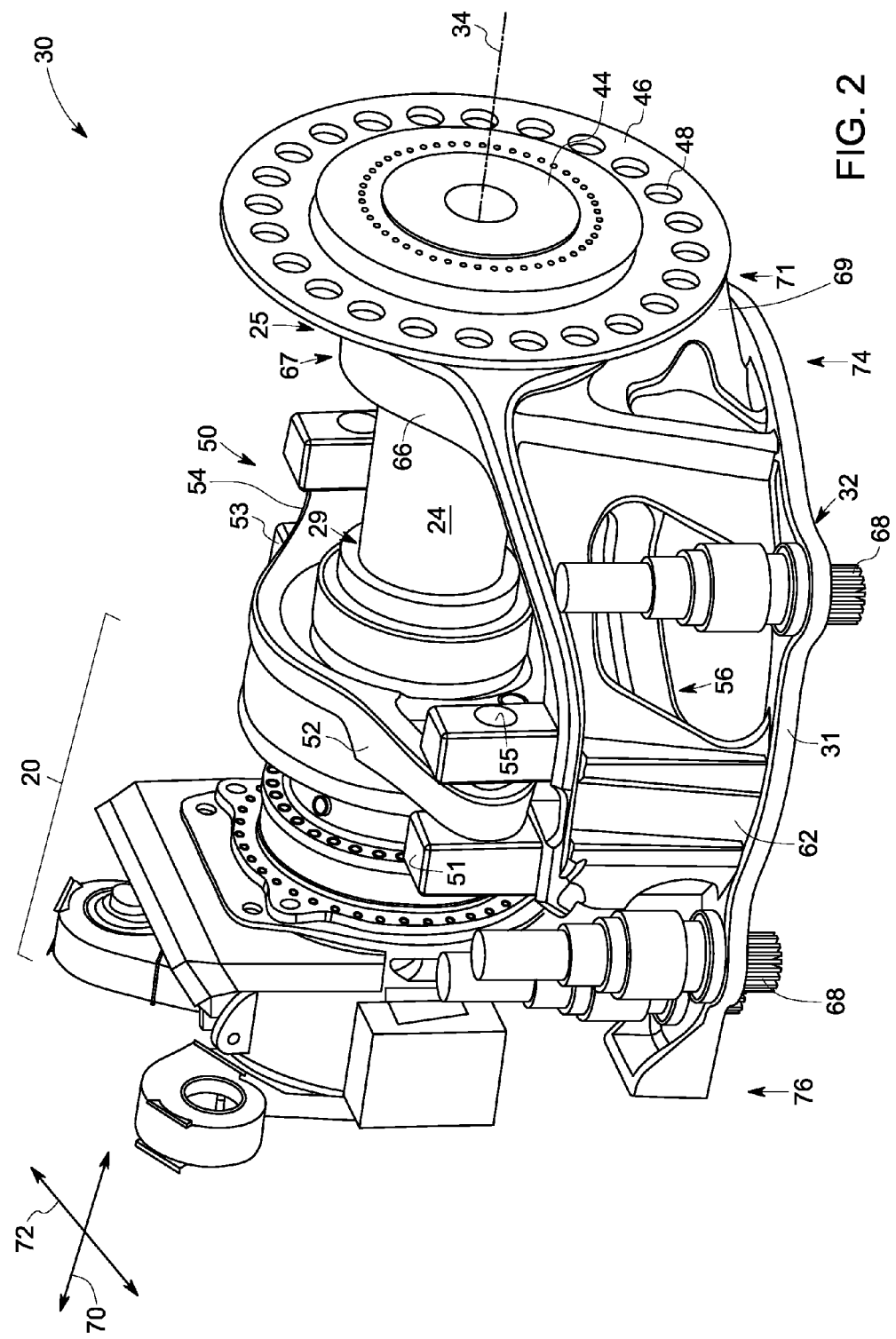
FIG. 2 is a perspective view of a bedplate assembly in accordance with an embodiment of the present invention.

FIG. 2 is a perspective view of the bedplate assembly 30 in accordance with an embodiment of the present invention. The bedplate assembly 30 includes the rotor shaft 24 with a first end 25 coupled to the rotatable hub 26 of the wind turbine 10 (as shown in FIG. 1). The rotor shaft 24 also includes an opposite second end 29 coupled to the gearbox 20. The bedplate assembly 30 includes a bedplate support frame 32 coupled to the gearbox 20 and to the rotor shaft 24 for supporting the gearbox 20. The bedplate support frame 32 is in turn mounted on the nacelle 16 (shown in FIG. 1) via a pedestal support 31. The rotor shaft 24 includes a substantially cylindrical body having a rotor flange 44 that is fixedly coupled to the first end 25. The rotatable hub 26 (as shown in FIG. 1) is coupled to rotor flange 44 such that a rotation of rotatable hub 26 about axis 34 facilitates rotating rotor shaft 24 about axis 34. A rotor locking disk 46 is coupled to first end 25 of the rotor shaft 24. The rotor locking disk 46 defines a plurality of openings 48 each extending through rotor locking disk 46 and positioned circumferentially about rotor locking disk 46. The bedplate support frame 32 also includes a circular support 66 located at an upper section 67 for housing a shaft support bearing (not shown) for supporting the rotor shaft 24 at the first end 25. The bedplate support frame 32 further includes a rotor lock support 69 at a lower section 71 of the frame 32 and towards the front section 74. The rotor lock support 69 is configured to lock and stop the rotation of the rotor shaft 24 and the rotor blades 28 (shown in FIG. 1) by insertion of the pointed portion of the rotor lock support 69 within any of the multiple openings 48 during the maintenance of the wind turbine 10.

Furthermore, the bedplate support frame 32 includes a torque arm support device 50 for supporting a first torque arm 52 and a second torque arm 54 at sides of the gearbox 20 as shown in a transverse direction 72 in FIG. 2. The torque arm support device 50 includes a first side load bearing mounts 51 and a second side load bearing mounts 53 for supporting each of the torque arms 52, 54 having a shaft 55. Each of the first and second side load bearing mounts 51, 53 includes a pair of pillar-like structures with load bearings that support the shaft 55 passing through the torque arms 52, 54 of the gearbox 20. As shown, the bedplate support frame 32 includes a first sidewall 62 and an opposite second sidewall 64 (not shown), each extending in a longitudinal direction 70 between a front section 74 and a rear section 76. Each of the first sidewall 62 and the second sidewall 64 includes a forward beam and a rear beam for providing support to the torque arm support device 50 having the pillar-like structures that support the torque arms 52, 54. Further, each of the first sidewall 62 and the second sidewall 64 are supported on the pedestal support 31 of the bedplate support frame 32. The bedplate support frame 32 also includes a cross-structure 56 that is described in details in FIG. 3.

Figure 3:
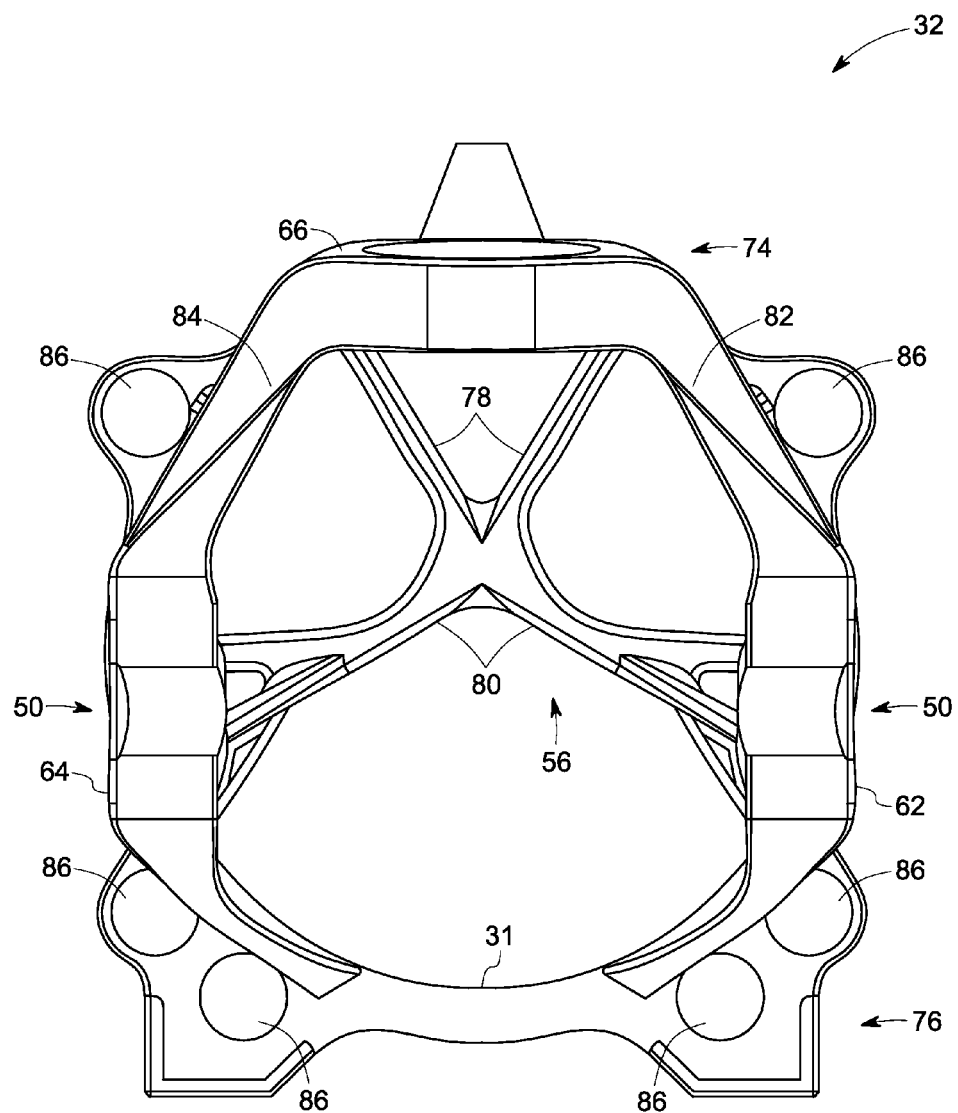
FIG. 3 is top view of a bedplate support frame in accordance with an embodiment of the present invention.

FIG. 3 is top view of a bedplate support frame 32 in accordance with an embodiment of the present invention. As shown, the bedplate support frame 32 includes the cross-structure 56 including a first pair 78 of symmetrical arms connected to a front section 74 of the bedplate support frame 32 and a second pair 80 of symmetrical arms connected internally to the first side wall 62 and a second side wall 64. In one embodiment, the first pair of symmetrical arms of the cross-structure includes an acute angle therebetween from about 35 degrees to 75 degrees, and the second pair of symmetrical arms of the cross-structure includes an obtuse angle therebetween from about 100 degrees to 140 degrees. At the front section 74, the first pair 78 of symmetrical arms is connected to a lower section 71 (shown in FIG. 2) of the circular support 66. As discussed, the circular support 66 provides housing for the shaft load bearing and includes a first side support structure 82 that is connected to the first sidewall 62 and an opposing second side support structure 84 that is connected to the second sidewall 64. The bedplate support frame 32 also includes multiple openings 86 at the lower section 71. The multiple openings 86 provides for an arrangement of a yaw drive mechanism 68. The yaw drive mechanism 68 comprises of cylindrical parts (as shown in FIGS. 2, 4, 5, and 6). In one embodiment, the yaw drive mechanism 68 is a motor oriented vertically that includes a pinion gear (not shown) on the rotor shaft 24. This pinion gear meshes with a large ring gear attached to the tower 12 (as shown in FIG. 1) on an outer race of yaw bearing. When the motor of the yaw drive mechanism 68 actuates, a drive train changes direction of the rotor blades 28 (shown in FIG. 1) to be oriented in the wind direction.

Figure 4:
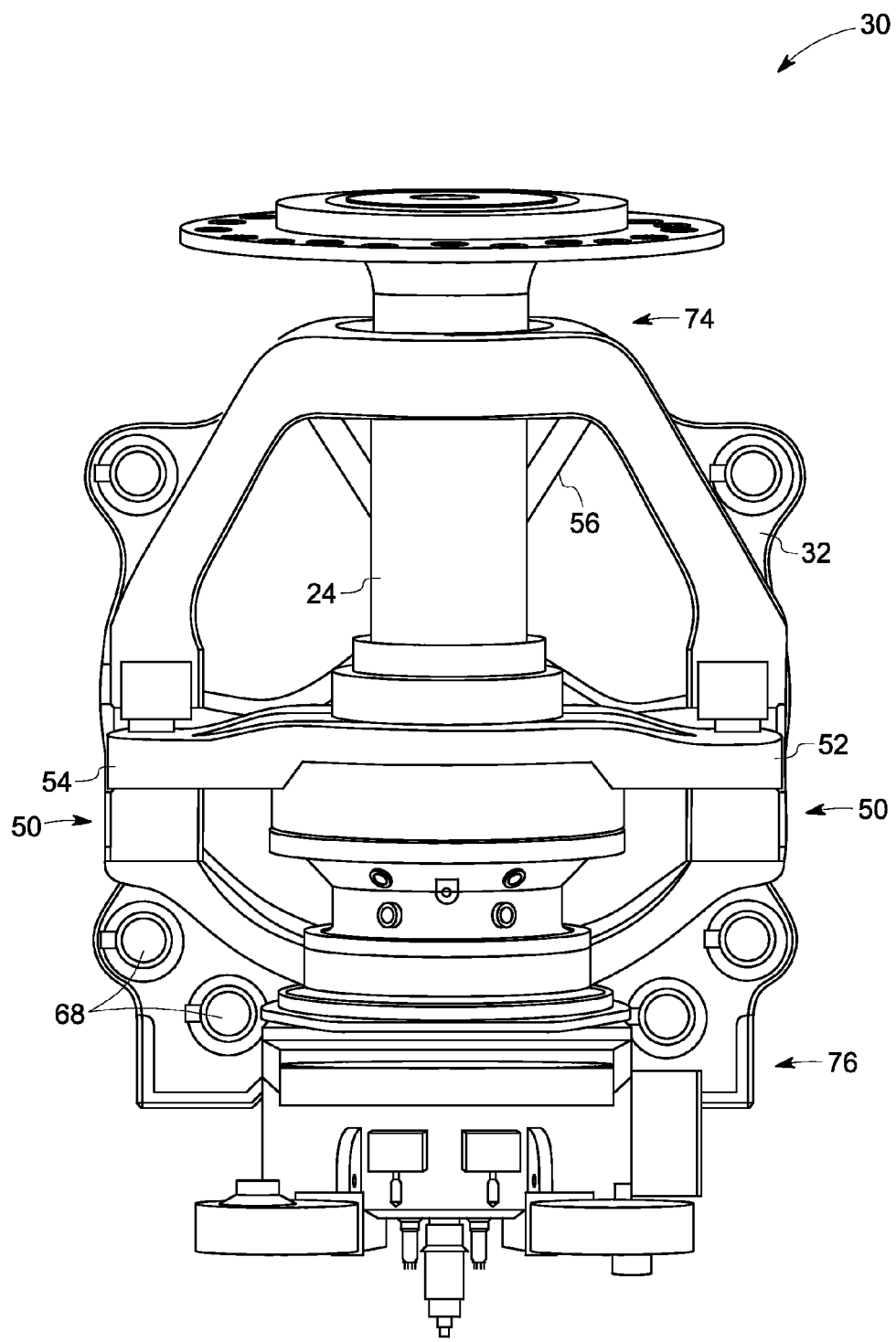
FIG. 4 is a top view of a bedplate assembly in accordance with an embodiment of the present invention.

FIG. 4 shows the cross-structure 56 being located towards the lower section 71 underneath the rotor shaft 24. This cross-structure 56 provides stability to the bedplate support frame 32 and holds the rotor shaft 24 and the rotor blades 28 in place when gearbox is removed during maintenance. The bedplate support frame 32 is thereby, able to withstand wind loads that occur during the maintenance periods. The cross-structure 56 is designed such that when moments in the axis of the tower 12 or perpendicular to the axis of the tower 12 are applied, the load is shared across the bedplate support frame 32 as well as around the perimeter of the bedplate support frame 32. This increases the stability of the bedplate support frame 32 and the wind turbine 10 (as shown in FIG. 1). When loads are applied to a bedplate support frame 32, there will be a tendency to twist and bend. However, the cross-structure 56 minimizes this twist or bending of the bedplate support frame 32. The cross-structure 56 allows stiffening of the bedplate support frame 32 thus further allowing reduced mass of the bedplate support frame 32. The cross-structure 56 also provides the ability to be used as an anchor point to constrain the rotor shaft 24 (shown in FIG. 1) while removing the drive train during maintenance.

Figure 5:
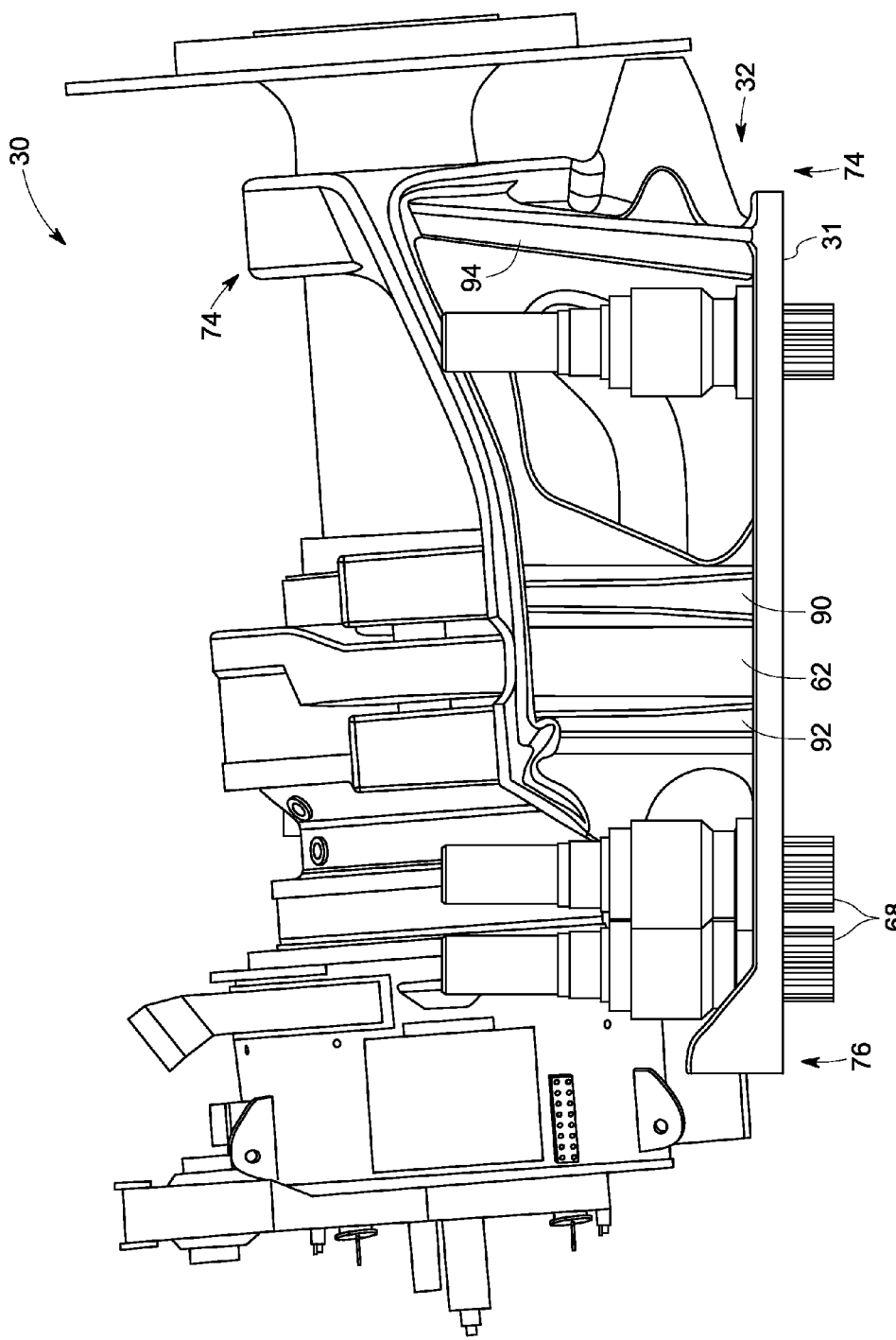
FIG. 5 is a side view of a bedplate assembly in accordance with an embodiment of the present invention.

FIG. 4 is a top view of the bedplate assembly 30 and partially illustrates the cross-structure 56 of the bedplate support frame 32 beneath the rotor shaft 24. Further, FIG. 5 is a side view of the bedplate assembly 30, showing a bedplate support frame 32 having the first sidewall 62 having a forward beam 90 and a rear beam 92. The opposing second sidewall 64 (not shown) also includes a front beam and a rear beam (not shown). The front section 74 of the bedplate support frame 32 includes a pair of structural beams (a first beam 94 is shown) extend from the circular support 66 and connects to the pedestal support 31. The front section 74 of the bedplate support frame 32 also includes a second beam (not shown) extending from the circular support 66 to the pedestal support 31.

Figure 6:
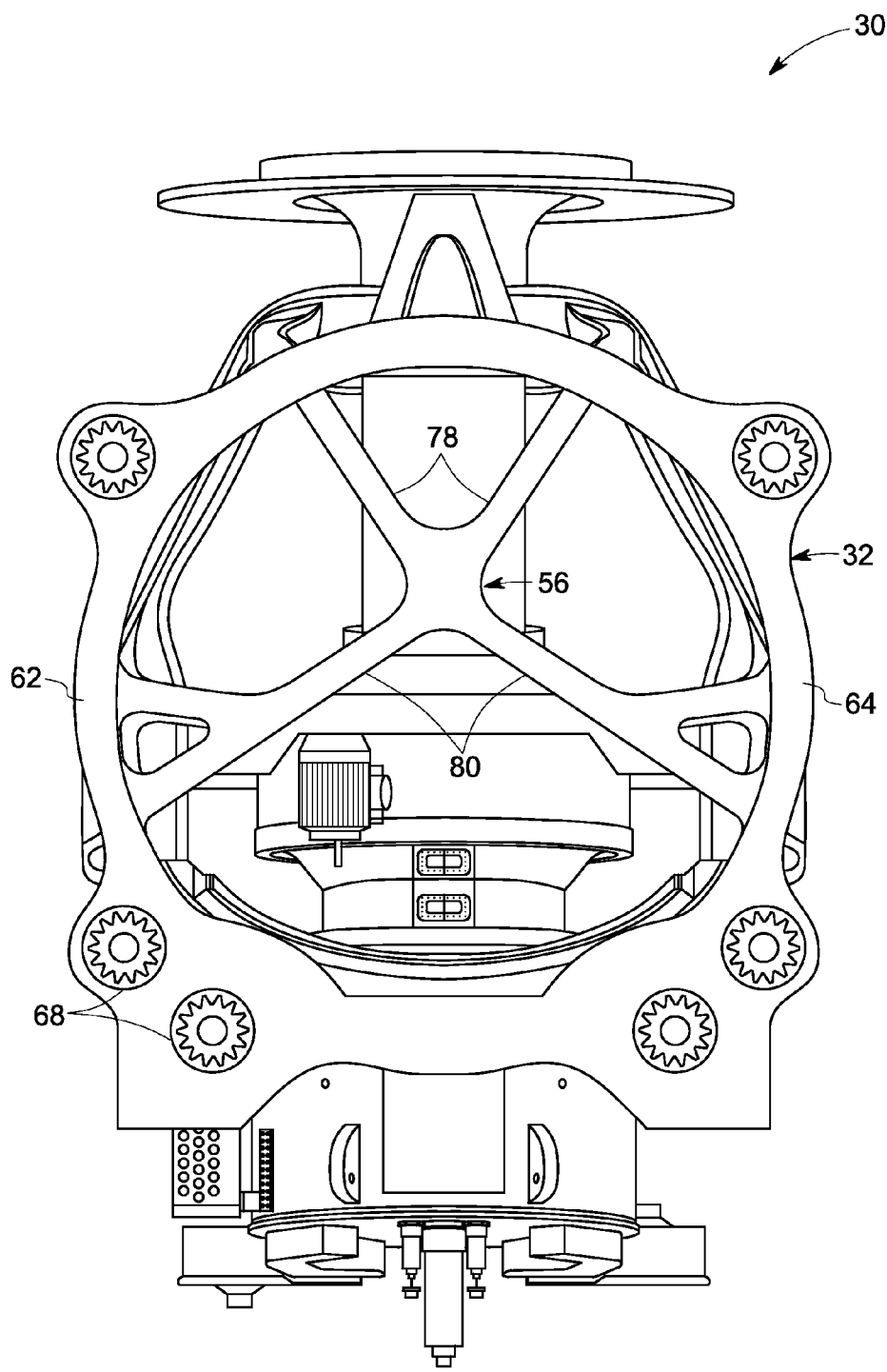
FIG. 6 is a bottom view of a bedplate assembly in accordance with an embodiment of the present invention.

FIG. 6 is a bottom view of the bedplate assembly 30 in accordance with an embodiment of the invention. As shown, the cross-structure 56 of the bedplate support frame 32 includes a first pair of symmetrical arms 78 connected to the underside of the circular support 66. The cross-structure 56 of the bedplate support frame 32 also includes a second pair of symmetrical arms 80 connected internally to the first sidewall 62 and the second side wall 64. Each of the second pair of symmetrical arms 80 includes Y-shaped ends that are attached to the first and the second sidewalls 62,64 at two points. In one embodiment, the Y-shaped ends of each of the pair of symmetrical arms 80 are connected to the forward and rear beams of the first sidewall 62 and the second sidewall 64 respectively.

During operation of wind turbine 10 (shown in FIG. 1), the gearbox 20 may require a repair and/or replacement. A gearbox handling assembly is configured to facilitate removing and/or replacing gearbox 20 uptower of wind turbine 10. Besides the bedplate assembly 30, such a gearbox handling assembly includes a positioning assembly comprising a yoking structure that is configured to contact the bedplate support frame. The positioning assembly is adapted to contact the gearbox to move the gearbox between a first position wherein the gearbox is operatively coupled to the rotor shaft and a second position wherein the gearbox is operatively decoupled and spaced from the rotor shaft to facilitate removing the gearbox from the wind turbine without removing the rotor from the wind turbine Advantageously, the present invention enables easy, efficient and economical gearbox handling during maintenance of a wind turbine due to a three point mount bedplate support frame coupled to the rotor shaft and the gearbox. The bedplate support frame of the present invention enables increased stability during maintenance or operation of the wind turbine and further allows use of a yoking system with reduced mass. This results in easy handling and installation of yoking system during maintenance of the wind turbine.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A bedplate assembly of a wind turbine, said assembly comprising:
   a rotor shaft with a first end coupled to a rotatable hub of the wind turbine via a rotor flange and a second end coupled to a gearbox; and
   a three point mount bedplate support frame coupled to the gearbox and to the rotor shaft for supporting the gearbox, wherein the bedplate support frame is situated below the gearbox and comprises:
      first and second opposing sidewalls each extending in a longitudinal direction between front and rear sections;
      a torque arm support device for supporting torque arms of the gearbox,
      a circular support for housing a shaft support bearing for supporting the rotor shaft at the first end; and
      a cross-structure located underneath the rotor shaft, wherein the cross-structure comprises a plurality of arms connected to each other in a form of a cross, the plurality of arms comprises a pair of front arms connected to the front section, one or more first side wall arms connected to the first side wall and one or more second side wall arms connected to the second side wall.

2. The assembly of claim 1, wherein the pair of arms connected to the front section comprise a front pair of symmetrical arms connected to the front section.

3. The assembly of claim 1, wherein the torque arm support device comprises a first side load bearing mounts and a second side load bearing mounts for supporting each of the torque arms having a shaft.

4. The assembly of claim 3, wherein the first side load bearing mounts and the second side load bearing mounts are fixed to the first sidewall and the second sidewall of the bedplate support frame.

5. The assembly of claim 2, wherein the circular support is connected to the front pair of symmetrical arms of the cross-structure underneath and further connected with a first side support structure and a second side support structure.

6. The assembly of claim 5, wherein the first side support structure is connected to the first side wall of the bedplate support frame.

7. The assembly of claim 5, wherein the second support structure is connected with the second side wall of the bedplate support frame.

8. The assembly of claim 1, wherein the first side load bearing mounts and the second side load bearing mounts are supported on the first side wall and the second side wall respectively.

9. The assembly of claim 1, wherein the bedplate support frame comprises a rotor lock support for stopping rotational motion of the rotor shaft during maintenance of the wind turbine.

10. The assembly of claim 1, wherein the bedplate support frame is about 3 meters in length about 2.3 meters in width.

11. The assembly of claim 2, wherein the front pair of symmetrical arms of the cross-structure include an acute angle from about 35 degrees to 75 degrees.

12. The assembly of claim 11, wherein the one or more arms connected to the first side wall and the one or more arms connected to the second side wall comprise a second pair of symmetrical arms, and wherein the second pair of symmetrical arms of the cross-structure include an obtuse angle from about 100 degrees to 140 degrees.

13. A wind turbine, comprising:
   a tower;
   a nacelle coupled to said tower;
   a gearbox positioned within said nacelle;
   a rotor;
   a rotor shaft rotatably coupling said rotor to said gearbox; and
   a three point mount bedplate support frame coupled to the gearbox and to the rotor shaft for supporting the gearbox, wherein the bedplate support frame is situated below the gearbox and comprises:
      first and second opposing sidewalls each extending in a longitudinal direction between front and rear sections;
      a torque arm support device for supporting torque arms of the gearbox,
      a circular support for housing a shaft support bearing for supporting the rotor shaft at the first end; and a cross-structure located underneath the rotor shaft, wherein the cross-structure comprises a plurality of arms connected to each other in a form of a cross, the plurality of arms comprises a pair of front arms connected to the front section, one or more first side wall arms connected to the first side wall and one or more second side wall arms connected to the second side wall.

14. The wind turbine of claim 13, wherein the bedplate support frame comprises a plurality of bolts for mounting the bedplate support frame to a nacelle of the wind turbine.

15. The wind turbine of claim 13, further comprising a torque arm support device having a first side load bearing mount and a second side load bearing mount for supporting each of the torque arms with a shaft at each of the torque arms.

16. A bedplate support frame for use in a wind turbine, said bedplate support frame comprising:
   a circular support located at a front portion of the bedplate support frame for housing a shaft support bearing for supporting a first end of a rotor shaft;
   a first sidewall and an opposing second sidewall, wherein the first sidewall comprises forward and rear first sidewall beams and the second sidewall comprises forward and rear second sidewall beams;
   a pedestal support for supporting the first sidewall, the second sidewall and the circular support at the front portion via a pair of front section beams; and
   a cross-structure that comprises a plurality of arms connected to each other in a form of a cross, the plurality of arms comprises a first pair of of symmetrical arms connected to the front portion of the bedplate support frame and a second pair of symmetrical arms connected internally to the first side wall and the second side wall.

17. The bedplate support frame of claim 16, further comprising a torque arm support device situated on the first sidewall and the second side wall for supporting torque arms of a gearbox coupled to a rotor shaft of the wind turbine and supported by the bedplate support frame.

18. The bedplate support frame of claim 17, wherein the torque arm support device comprises a first side load bearing mounts and a second side load bearing mounts for supporting each of the torque arms having a shaft.

19. The bedplate support frame of claim 16, further comprising a plurality of openings for providing an arrangement of a yaw drive mechanism.

20. The bedplate support frame of claim 16, wherein each of the second pair of symmetrical arms comprises Y-shaped ends attached internally to the forward and rear first sidewall beams and the forward and rear second sidewall beams respectively.

21. The bedplate support frame of claim 16, wherein the front portion includes a rotor lock support.

* * * * *